United States Patent
Moore

(10) Patent No.: US 6,715,608 B1
(45) Date of Patent: Apr. 6, 2004

(54) PACKAGE FOR WELDING WIRE

(75) Inventor: William J. Moore, Chagrin Falls, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 50 days.

(21) Appl. No.: 09/985,722

(22) Filed: Nov. 6, 2001

(51) Int. Cl.[7] .......................... B65D 85/66; B65H 18/28; B65H 75/24
(52) U.S. Cl. .................. 206/397; 206/408; 206/409; 242/170; 242/578
(58) Field of Search ................... 206/397, 398, 206/389, 225, 392, 408, 409, 388, 403, 407; 220/8; 242/159, 170, 171, 578, 578.2, 128; 222/549, 99, 464.5

(56) References Cited

U.S. PATENT DOCUMENTS

| | | | |
|---|---|---|---|
| 4,451,014 A | * | 5/1984 | Kitt et al. ............... 242/128 |
| 4,591,110 A | * | 5/1986 | Wirts et al. ............. 206/407 |
| 4,869,367 A | * | 9/1989 | Kawasaki et al. ........ 206/409 |
| 5,277,314 A | | 1/1994 | Cooper |
| 5,746,380 A | | 5/1998 | Chung |
| 5,758,834 A | | 6/1998 | Dragoo |
| 5,819,934 A | | 10/1998 | Cooper |

\* cited by examiner

Primary Examiner—Mickey Yu
Assistant Examiner—Gregory Pickett
(74) Attorney, Agent, or Firm—Fay, Sharpe, Fagan, Minnich & McKee, LLP

(57) ABSTRACT

A transporting and feeding package for a coil of welding wire comprising a wire receiving container with a vertical wall having a lateral shape and defining an opened top of the container, a wire feeding hat with a wire outlet and a downwardly extending skirt having a lower end with an opening and having a shape matching, but slightly larger than, said lateral shape so the skirt can move vertically along the vertical wall between a lowered transporting position and a raised feeding position while extending over said opened top of the container.

16 Claims, 5 Drawing Sheets

PACKAGE FOR WELDING WIRE

The present invention relates to the art of electric arc welding and more particularly to a package for transporting a coil of electric arc welding wire from the manufacturer to the end user.

INCORPORATION BY REFERENCE

In automatic arc welding, it is common practice to provide a large supply of welding wire in a package that is delivered to the welding equipment and connected to the welder. This procedure provides a continuous supply of welding wire. The wire is coiled in the package for transportation and for feeding the welding wire to the welder. During use, the welding wire is uncoiled from the package and is directed through a feeding dome normally referred to as a "hat", as shown in Cooper 5,277,314, incorporated by reference herein. Such transporting and feeding package is in the form of a cylindrical fiberboard drum with a center fiberboard core around which the wire is coiled. The wire is pulled from the drum through the hat under the control of a retaining member in the form of a flat ring extending around the core. The retaining member is also referred to as a "payout ring" or "brake ring", since it controls the movement of the wire as it is being pulled from the package. This Cooper patent is incorporated by reference as background information as known technology in the electric arc welding art. It shows a package for transporting and feeding electric welding wire. Another package for transporting and feeding coiled welding wire is illustrated in Chung 5,746,380, incorporated by reference herein. As in the Cooper patent, this Chung patent is incorporated by reference as background information showing a transporting and feeding package with an upper feeding hat through which the welding wire is pulled during the welding operation Another welding wire package is shown in Dragoo 5,758,834, incorporated by reference herein. This third patent merely disclose and describe the background information to which the present invention is directed. The invention is used with a package utilizing a pull down bar for biasing the retaining member, so the coiled welding wire can settle during transportation. This known background wire packaging technology is described in Cooper 5,819,934, incorporated by reference herein. By incorporating all of these patents into the application as background information, it is not necessary to explain the known welding wire package technology in the field to which the present invention is directed.

BACKGROUND OF INVENTION

When using a transporting and feeding package for electric arc welding wire, the package usually takes the form of a drum or octagonally shaped box with an open top end closed by a lid during shipment. As shown in Cooper 5,819,934, the fiberboard drum or other package is closed at its top for transportation and the retainer member is biased downwardly against the coiled welding wire. This packaging concept is well known in the trade and is used by many welding wire producers. When the package of welding wire is received by the factory for use in a welding operation, the lid of the package is removed, the pull down bar is withdrawn and a hat is positioned over the top of the package. The hat has a shape matching the outer peripheral shape of the package. Such hats are shown in Cooper 5,277,314, Chung 5,746,380 and Dragoo 5,758,834. The operator must select a hat which will match the open end of the package and thread wire from the coil through the feeding opening on the top of the hat. Then, the hat is moved downwardly and fixed upon the open end of the package. The wire threading operation and the hat mounting procedure is time consuming and requires a certain amount of skill. Since various manufacturers have different size drums and the packages vary between a round package and an octagonally shaped package, a special hat must be assigned to each of the packages and probably to each of the manufacturers of the welding wire. This requires a matching of the feeding hat with the transporting and the feeding package. Since the welding process is in a factory environment, the hat awaiting use on the package can become distorted or otherwise damaged. This requires further man power to straighten the hat and assemble the hat after the wire has been threaded through the feeding opening. This is the procedure now being used and it has the discussed disadvantages which are overcome by the present invention.

THE INVENTION

The present invention involves a package for transporting and feeding a coil of welding wire used for automatic welding in welding equipment, such as robotic welders. This new package overcomes the disadvantages of the use of a separate hat that must be installed by the end user. In accordance with the invention, a wire package includes a feeding hat that has a flat top and is the lid for the wire container. The hat has a downwardly extending skirt with a shape matching the outer shape of the wire container with elements on the skirt and on the outside wall of the container allowing the hat to be held in the downward position during transportation. At the welding equipment, it is merely necessary to disengage the elements holding the lid or the container on the container. The hat is then raised and locked into an upper position. At this time, the previously threaded wire is disengaged from the lid and directed to the welding equipment. By using the lid of the container as a feeding hat, the hat is shipped with the container and it is not necessary to locate, assemble and mount a hat at the welding equipment.

In accordance with the invention, there is provided a transporting and feeding package for a coil of welding wire. The package comprises a wire receiving container with a vertical wall having a lateral shape and defining an open top of the container. The container can be round, square or have other lateral configurations. The wire feeding hat, with a wire outlet and a downwardly extending skirt having a lower end with an opening can be moved vertically along the vertical wall of the container between a lower transporting position and a raised feeding position. Thus, the hat forms a lid for the container and the wire is pulled from the coil and fastened on the outside of the lid. An aspect of the invention involves a first engagement element on the hat near the lower end of the skirt and matching a second engagement element on the vertical wall near the open end of the container. These two elements engage each other to lock the hat vertically with respect to the container when the hat is in the raised feeding position. Thus, the elements engage each other when the hat is in the raised feeding position and are disengaged from each other when the hat is in the lower transporting position. In this lower position, hold down elements, such as pieces of tape, are secured between the skirt and vertical wall of the container to hold the hat in the lowered position. Thus, the hat forms a transporting lid for the package.

In accordance with another aspect of the present invention, the first and second elements include a recess in the container and protrusions on the skirt of the hat. As another equivalent arrangement, the element that protrudes is at the top of the container wall and the recessed element or engagement element to capture the protruding element is on the lower end of the skirt. All of these arrangements are directed to the concept of a mechanism allowing the hat to slide up the container and then snap into the raised position where it is held during the subsequent feeding operation. There is no need, nor requirement, to thread wire through the hat, since the hat is integrally formed with the container to constitute the total package. The wire is shipped with a leading portion extending through the feeding opening of the hat in the preferred embodiment of the invention. In accordance with the preferred embodiment of the invention, the container is a drum with a central cylindrical core around which the wire is coiled. A freely movable payout ring or retainer ring extends around the core and exerts pressure on the coiled wire, which pressure is biased during transporting and is merely held by gravity during feeding. The ring forms a payout ring or braking ring for the wire during the feeding operation. During shipment, in accordance with an aspect of the invention, the package has a biased hold down bar extending across the payout ring and through vertical slots in the center core and out a single slot in the container whereby the payout ring is biased downwardly during transportation. The hold down bar is withdrawn from the container after the hat is moved into the upper feeding position at the welding equipment. This releases the hold down of the retainer ring allowing the ring to form a braking operation.

The primary object of the present invention is the provision of a package for transporting and shipped coiled welding wire, which package has a lid that is also a feeding hat.

Yet another object of the present invention is the provision of a package, as defined above, which package allows shipment of the wire in a standard biased hold down condition with the welding wire extending through the feeding opening of the hat to facilitate positioning of the hat, removing of the hold down bar and connecting the wire to the welding equipment by rapidly performed, simple manual procedures.

Another object of the present invention is the provision of a package, as defined above, which package includes elements between a lower skirt of the hat and the outer wall of the container forming the package whereby the hat is snapped and/or locked in the upper raised position.

Yet another object of the present invention is the provision of a package, as defined above, which package, with its integral hat, can be returned to the manufacturer for reuse.

Still another object of the present invention is the provision of a package, as defined above, which package can be used with round containers or drums, polyagonally shaped containers, containers with center cores, containers without center cores and a variety of other package configurations and designs.

These and other objects and advantages will become apparent from the following description taken together with the accompanying drawings.

PREFERRED EMBODIMENT OF THE INVENTION

Figure 6:
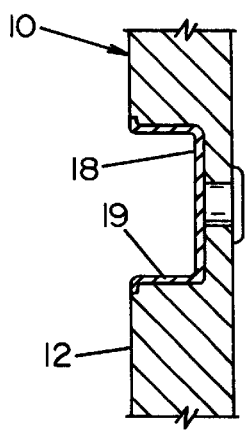
FIG. 6 is an enlarged cross sectional view of the recessed portion at the upper end of the container to receive the element illustrated in FIG. 5 for locking the hat in the raised feeding position.

Referring now to the drawings wherein the showings are for the purpose of illustrating a preferred embodiment of the invention only and not for the purpose of limiting same, FIGS. 1–6 show a package A for shipping and feeding coil B of electric arc welding wire W. The package includes a container, shown as a cylindrical fiberboard drum with vertical side wall 12 having an outer peripheral shape illustrated as being round. The package could be square or polygonal in shape. Container 10 includes an opened top end 14 and at least one vertically extending slot 16 below an annular recess groove 18 defining the upper element of engaging elements used in the preferred embodiment of the present invention. Groove 18 is formed near top 14 of drum or container 10 and preferably includes a protective metal liner 19, as best shown in FIG. 6. Within the container there is a central cylindrical core 20 around which coil B is laid during the manufacturing of welding wire W. Some packages do not have a center core; however, in the preferred embodiment a center core is used to maintain coil B centered within container 10. Diametrically positioned vertically extending slots 22, 24 span the location of inner retainer ring when the coil is loaded into container 10. During the wire feeding operation, a spacing 32 between core 20 and floating ring 30 allows the wire W to pass from coil B to the welder. Ring 30 is a payout ring or a braking ring to control the movement of the wire as it is payed out during the welding operation. Slots 22, 24 are to receive hold down bar 40 having a free end 42 and a flanged outer end 44 with finger grip 46. An elastic band 48 holds bar 40 biased downward against the top of ring 30 during transportation of package A. In this manner, as the coiled wire settles during transportation, ring 30 maintains a biased force against coil B for stability during shipment. Bar 40 extends through vertically extending slot 16 in container 10. In the prior art, there is no need for a slot in the container to receive hold down bar 40. The prior art construction is shown in Cooper 5,819,934. In the prior art, container 10 has a lid to cover opening 14 during transportation. At the welding operation, the end user removes the lid, pulls out the hold down bar allowing ring 30 to float on the top of coil B during the payout of wire W in the welding operation. Thereafter, the wire must be threaded through a hat and the hat positioned over the top of container 10. Finger ring 46 allows horizontal withdrawal of bar 40 through vertically extending slot 16. During transportation, an elastic band 48 is connected to the bottom of drum 10 and looped around bar 40 to pull the bar downwardly to compress coil B.

Figure 1:
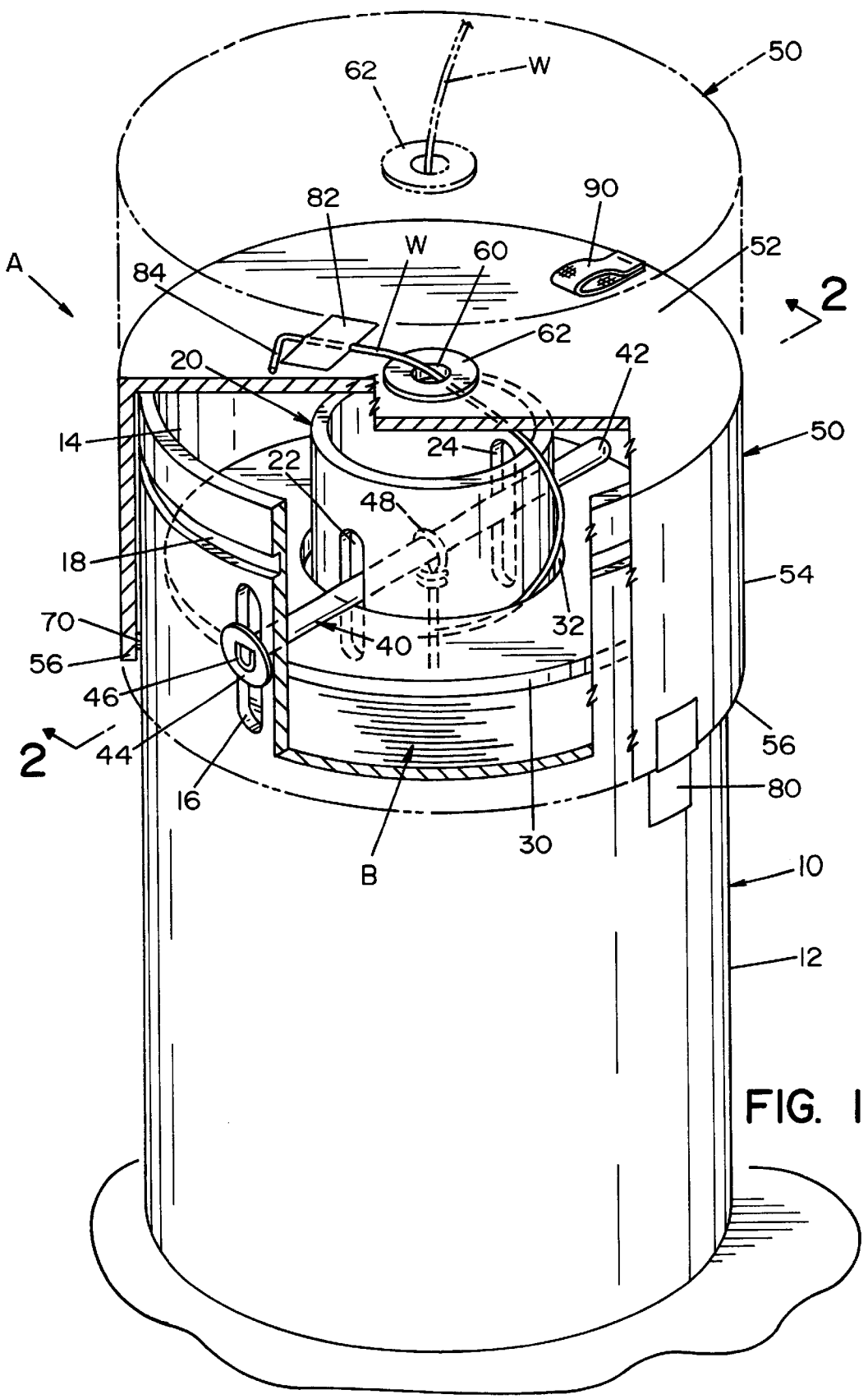
FIG. 1 is a pictorial view illustrating the preferred embodiment of the present invention with the combined lid and hat in the lower transportation position, but illustrated by phantom line in the upper feeding position.
Figure 2:
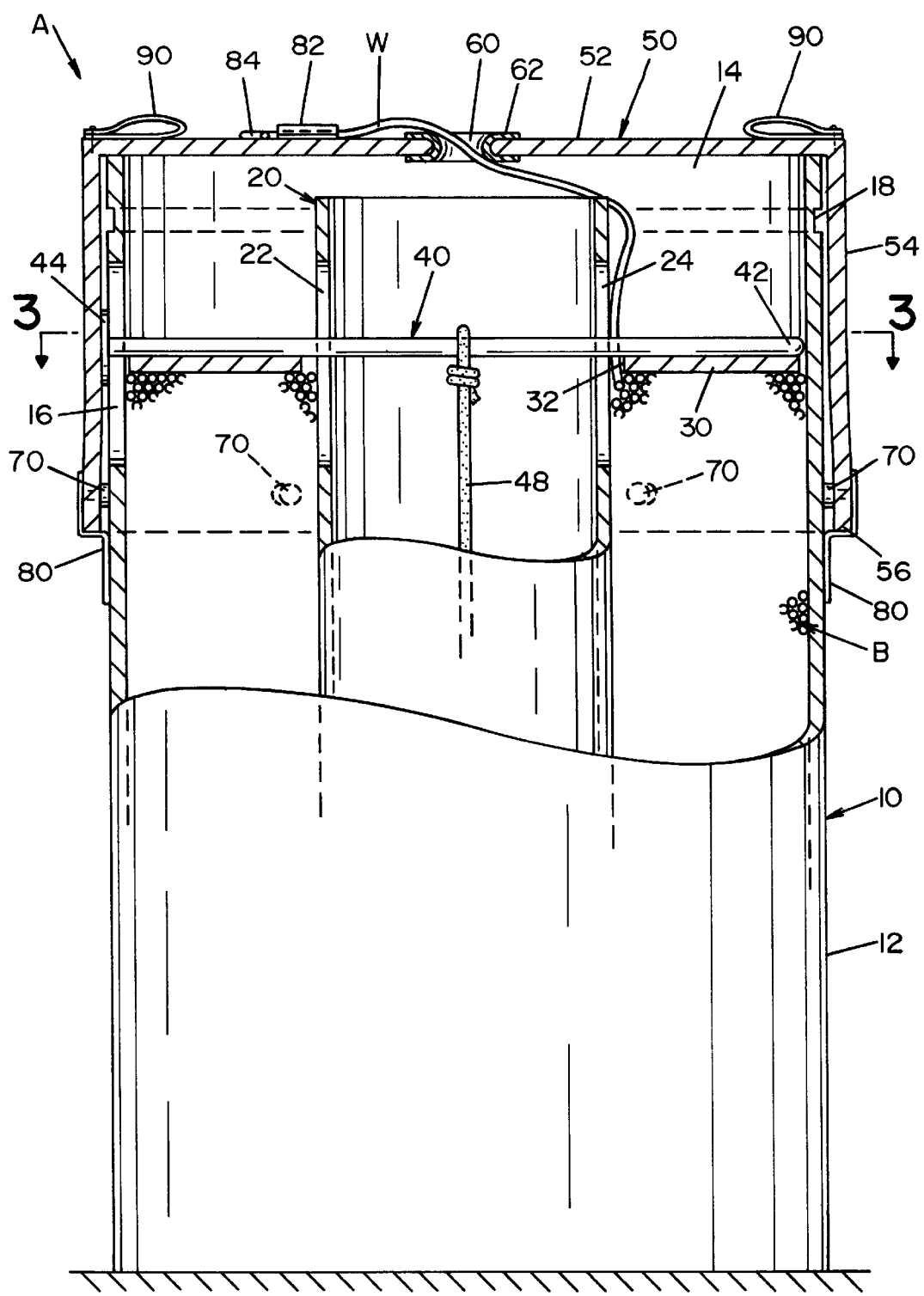
FIG. 2 is a partial cross sectional view taken generally along line 2—2 of FIG. 1 and illustrating the combined lid and hat in the lowered transporting position.
Figure 3:
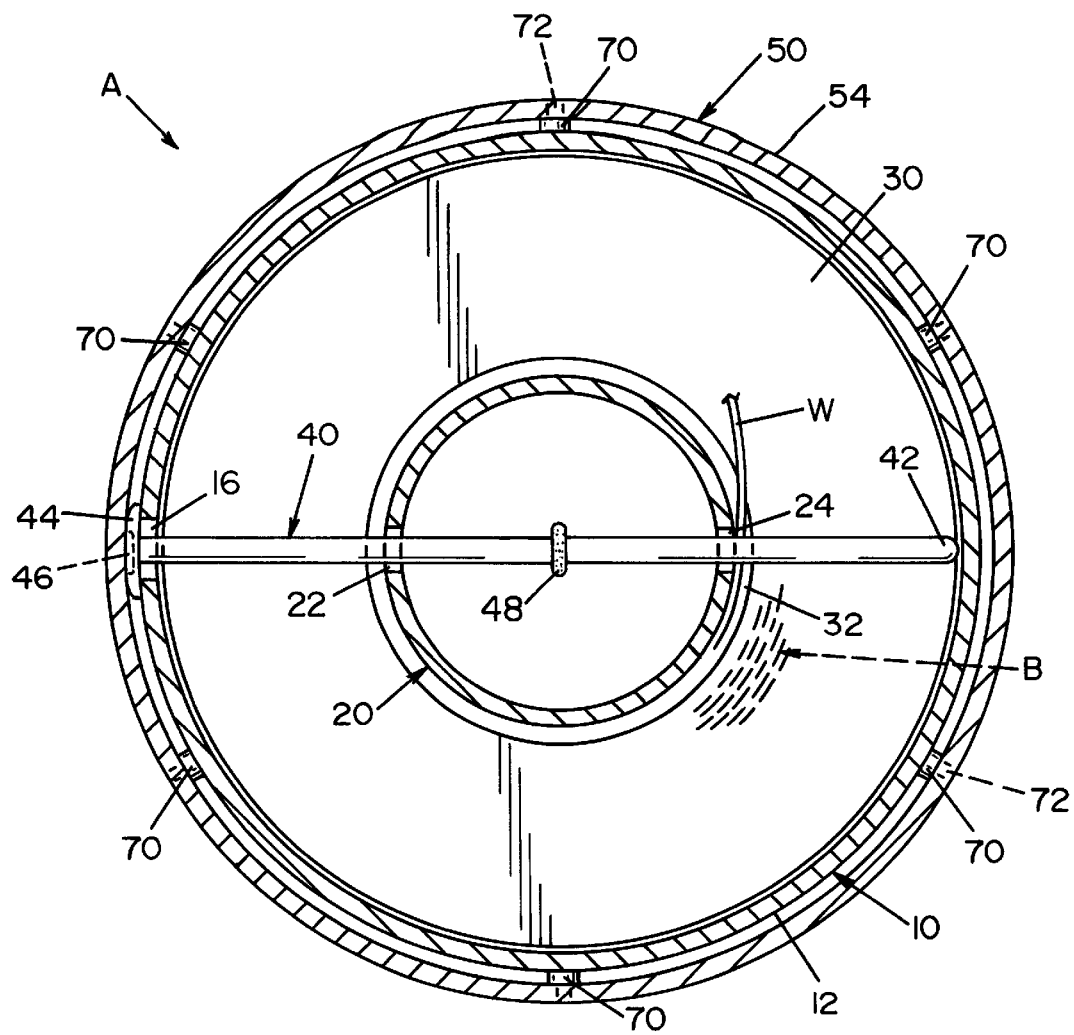
FIG. 3 is a cross sectional view taken generally along line 3—3 of FIG. 2.
Figure 5:
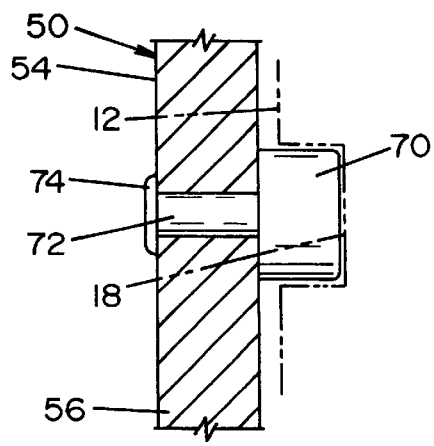
FIG. 5 is an enlarged partial view illustrating in cross section the engaging element near the lower end of the skirt of the combined lid and hat.
Figure 4:
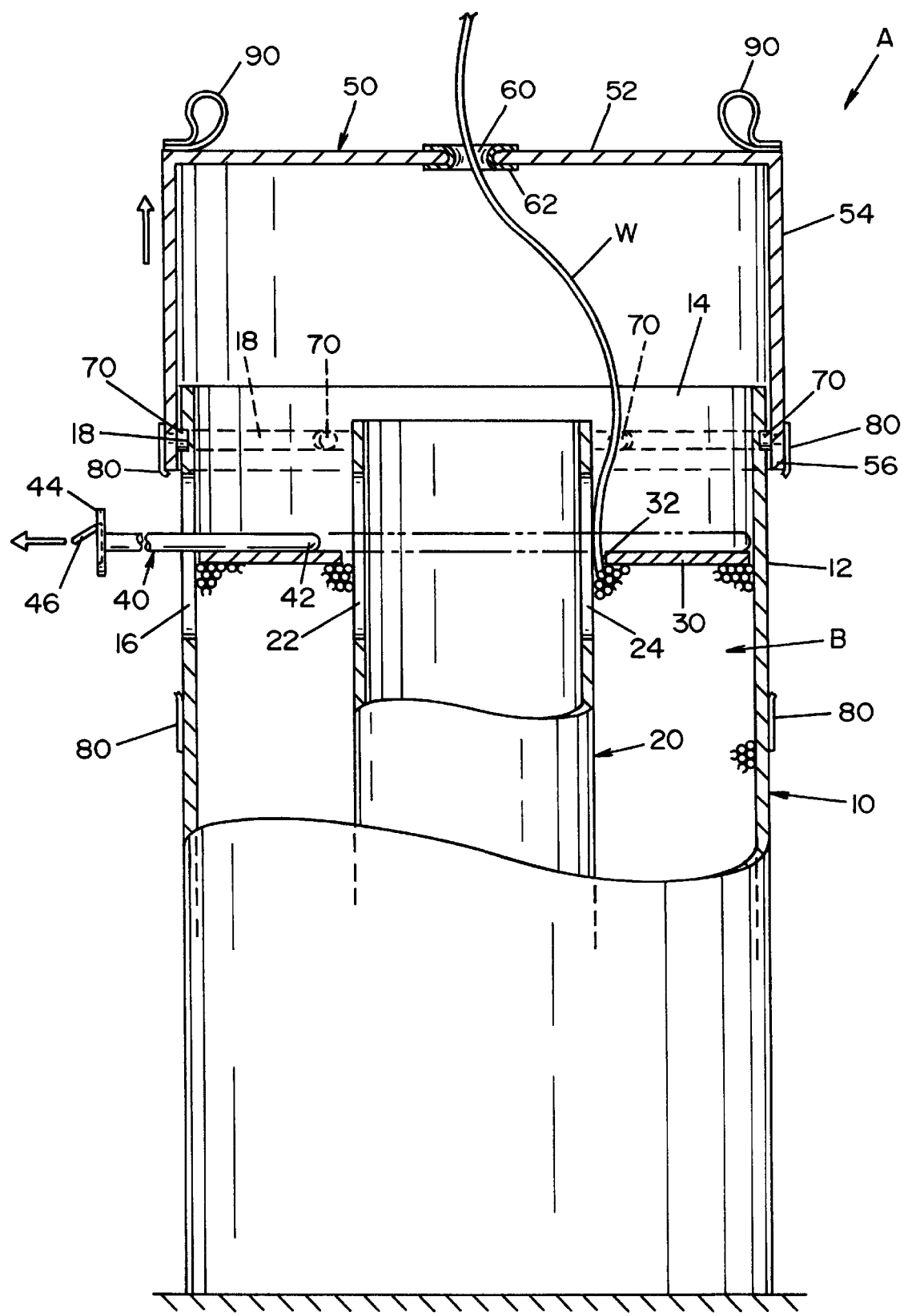
FIG. 4 is a view similar to FIG. 2 showing the combined lid and hat in the raised feeding position and illustrating the lateral withdrawal of the transporting pull down bar.

In accordance with the present invention, the lid for container 10 is a combined lid and hat 50 hereinafter referred to as a "hat." The hat includes a top 52 with a downwardly extending skirt 54 having a shape matching vertical wall 12, but slightly larger than the vertical wall, to allow sliding movement of the hat in a vertical direction between a lowered transporting position and a raised feeding position. The lower end 56 of skirt 54 is opened and defines the amount of vertical movement allowed when shifting hat 50 between its lowered and upper position. In both positions, lower end 56 is still around wall 12 of container 10. Top 52 has a center wire outlet 60 in the form of eyelet 62 so that the wire can be pulled through the eyelet during feeding of wire from container 10. Inwardly protruding elements 70 are fixed at lower end 56 in a variety of manners, illustrated as a rivet 72 with an upset outer end 74, in FIG. 5. Any number of inwardly extending elements 70, which are shown as cylindrical pegs, are spaced circumferentially around wall 12. Six cylindrical, inwardly extending pins 70 are used in the preferred embodiment as shown in FIG. 3. If the outer shape of container 10 is not cylindrical, inwardly extending elements 70 are spaced around the lower end 56. The elements are preferably in a single plane. Of course, these pins could be in different vertical planes as long as the receiving element 18 matched the element 70 when hat 50 is moved upwardly into the raised feeding position as shown in FIG. 4. During shipment, hat 50 is held in the lower position as shown in FIG. 2 by a series of hold down tape segments 80, which are cut or otherwise disengaged to release hat 50 for movement into the raised position with elements 70 engaging groove 18. Lift straps 90 are fixed onto the top 52 of hat 50 to facilitate any manual movement of the hat from the position shown in FIG. 2 to the position shown in FIG. 4. During shipment, wire W is provided with a hook 84 at one end so that the end of the wire can extend through the eyelet and not pull from hold down tape segment 82.

Package A is shipped from the wire manufacturer to the end user with hat 50 in the lower transporting position shown in FIG. 2. Tape segments 80 hold hat 50 in the downward position and the wire W extends through eyelet 62 and is held to top 50 by hook 84. At the end user, tape segments 80 are cut or otherwise separated. Hat 50 is moved upwardly into the feeding position shown in FIG. 4 where cylindrical pegs or elements 70 engage groove 18 at the top of wall 12. Lift straps 90 facilitate this shift of the hat into the feeding position. Elements or cylindrical pegs 70 snap into groove 18 to lock the hat in the raised position. With the hat raised, the outer flanged end 44 of hold down bar 40 is exposed below lower end 56. The bar is pulled laterally using finger ring 46 to remove the bar from the container by way of slot 16. This releases elastic band 48 and frees ring 30 for movement downwardly as coil B reduces in vertical height by the construction of wire W. After the container is empty, hat 50 can be pushed or forced downwardly and the package can be shipped back to the manufacturer. However, this ability to reuse package A is not a part of the invention which relates to the integral hat movable between the transporting position and the raised wire feeding position. There is no need for the end user to have a particular hat especially designed for the container since the hat is part of the package and is on the container.

Figure 7:
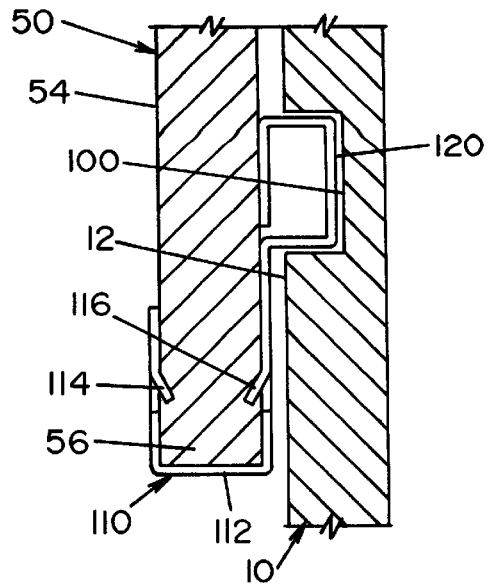
FIG. 7 is an enlarged cross sectional view showing an alternative form of the engaging elements as illustrated in FIGS. 5 and 6; and, FIG. 8 is a partial top cross sectional view of an alternative embodiment of the invention, wherein the recess on the lower end of the skirt engages a circular rim at the upper end of the container to define the locked raised feeding position of the combined lid and hat.
Figure 8:
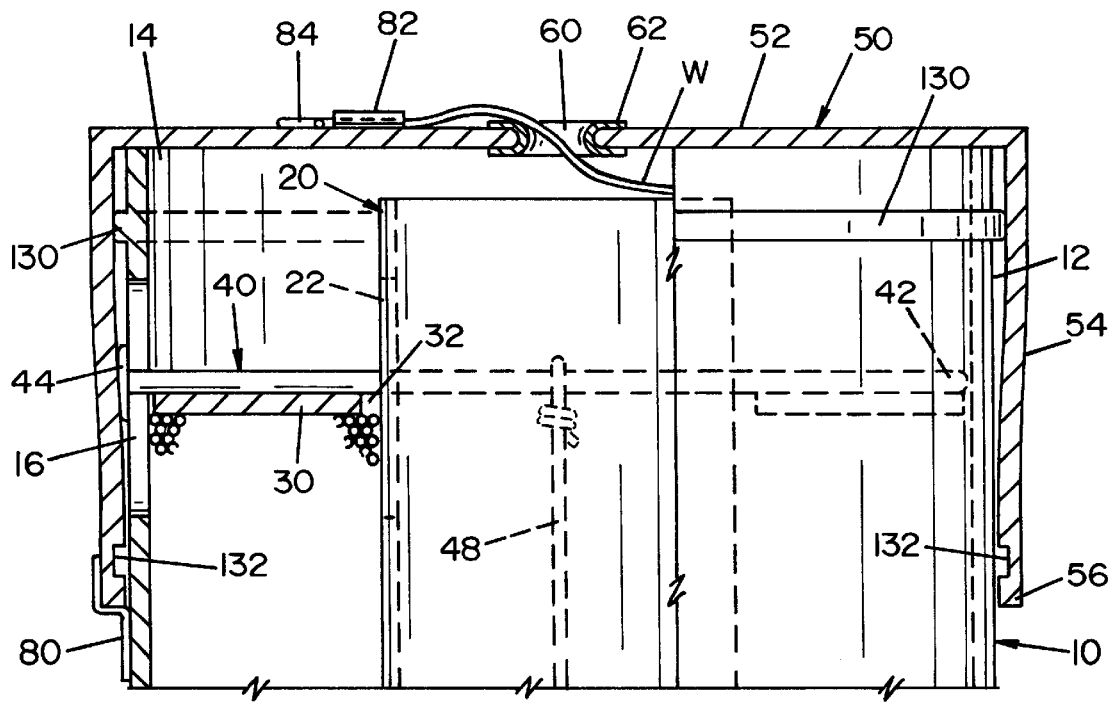

FIG. 7 shows an alternative arrangement for the engaging elements to hold hat 50 in the raised feeding position. A circular recess 100 is essentially the same as recess 18 shown in FIG. 6. A series of stamped spring steel fasteners 110 are used in place of cylindrical pegs 70 shown in FIG. 5. The fasteners each include an upstanding channel 112 held by barbs 114, 116 on end 56 of hat 50. Formed rib 120 protrudes outwardly from wall 54 into recess or groove 100 to hold the hat in the raised feeding position. Other arrangements could be used for forming the engaging elements between the lower end 56 of hat 50 and the upper opened top 14 of wall 12. Another modification of the invention is shown in FIG. 8 wherein recess 18 is replaced by outwardly extending rib 130 circumferentially around wall 12 at open end 14. This circular rib is a first engaging element, whereas the second engaging element is recess 132 extending around lower end 56 of skirt 54. Engaging elements 130, 132 interlock to hold hat 50 in the raised feeding position. Other arrangements can be used for holding the hat in the raised position by engagement between an element on the top of wall 12 and an element of the bottom of skirt 54.

What is claimed is:

1. A transporting and feeding package for a coil of welding wire, said package comprising a wire receiving container with a vertical wall having a lateral shape and defining an opened top of said container, a wire feeding hat with a wire outlet and a downwardly extending skirt having a lower end with an opening and having a shape matching, but slightly larger than, said lateral shape so said skirt can move vertically along said vertical wall between a lowered transporting position and a raised feeding position while extending over said opened top, a first engagement element on said hat near the lower end of said skirt of said hat and a matching second engagement element on said vertical wall near the opened top of said container to engage said first element to lock said hat vertically with respect to said container when said hat is in said raised feeding position, whereby said elements engage each other when said hat is in said raised feeding position and are disengaged from each other when said hat is in said lowered transporting position, said first element is a recess around said lower end of said skirt and said second element is a member or members protruding from said vertical wall near said opened top of said container to capture said first element when said hat is in said raised feeding position, said container has a central cylindrical core around which said wire is coiled, said package further including a freely movable payout ring around said core and over said wire and a biased hold down bar extending across said payout ring, through vertical slots in said core and out at least a vertical slot in said container vertical wall whereby said payout ring is biased downwardly against said wire when said hat is in said transporting position.

2. A package as defined in claim 1 including a finger grip element to pull said hold down bar outwardly from said container.

3. A transporting and feeding package for a coil of welding wire, said package comprising a wire receiving container with a vertical wall having a lateral shape and defining an opened top of said container, a wire feeding hat with a wire outlet and a downwardly extending skirt having a lower end with an opening and having a shape matching, but slightly larger than, said lateral shape so said skirt can move vertically along said vertical wall between a lowered transporting position and a raised feeding position while extending over said opened top, a first engagement element on said hat near the lower end of said skirt of said hat and a matching second engagement element on said vertical wall near the opened top of said container to engage said first element to lock said hat vertically with respect to said container when said hat is in said raised feeding position, whereby said elements engage each other when said hat is in said raised feeding position and are disengaged from each other when said hat is in said lowered transporting position, said first element is an inwardly protruding member or members and said second element is a recess around said container near said opened top of said container to capture said first element when said hat is in said raised feeding position, said container has a central cylindrical core around which said wire is coiled, a freely movable payout ring around said core and over said wire and a biased hold down bar extending across said payout ring, through vertical slots in said core and out at least a vertical slot in said container vertical wall whereby said payout ring is biased downwardly against said wire when said hat is in said transporting position.

4. A package as defined in claim 3 including a finger grip element to pull said hold down bar outwardly from said container.

5. A transporting and feeding package for a coil of welding wire, said package comprising a wire receiving container with a vertical wall having a lateral shape and defining an opened top of said container, a wire feeding hat with a wire outlet and a downwardly extending skirt having a lower end with an opening and having a shape matching, but slightly larger than, said lateral shape so said skirt can move vertically along said vertical wall between a lowered transporting position and a raised feeding position while extending over said opened top, a first engagement element on said hat near the lower end of said skirt of said hat and a matching second engagement element on said vertical wall near the opened top of said container to engage said first element to lock said hat vertically with respect to said container when said hat is in said raised feeding position, whereby said elements engage each other when said hat is in said raised feeding position and are disengaged from each other when said hat is in said lowered transporting position, said container has a central cylindrical core around which said wire is coiled, a freely movable payout ring around said core and over said wire and a biased hold down bar extending across said payout ring, through vertical slots in said core and out at least a vertical slot in said container vertical wall whereby said payout ring is biased downwardly against said wire when said hat is in said transporting position.

6. A package as defined in claim 5 including a finger grip element to pull said hold down bar outwardly from said container.

7. A package as defined in claim 6 wherein said lateral shape and said matching shape are circular.

8. A package as defined in claim 5 wherein said lateral shape and said matching shape are circular.

9. A package as defined in claim 4 wherein said lateral shape and said matching shape are circular.

10. A package as defined in claim 3 wherein said lateral shape and said matching shape are circular.

11. A package as defined in claim 2 wherein said lateral shape and said matching shape are circular.

12. A package as defined in claim 1 wherein said lateral shape and said matching shape are circular.

13. A transporting and feeding package for a coil of welding wire, said package comprising a container in the form of a drum with a combined lid and feeding hat mounted over the opened top end of said drum engaging elements on said hat and drum to lock said hat on said drum in a raised upper feeding position, said container has a central cylindrical core around which said wire is coiled, a freely movable payout ring around said core and over said wire and a biased hold down bar extending across said payout ring, through vertical slots in said core and out at least a vertical slot in said container whereby said payout ring is biased downwardly against said wire when said hat is in said lower transporting position.

14. A package as defined in claim 13 wherein the wire extends through the feeding opening of said hat when the hat is not in the raised feeding position. having a shape matching, but slightly larger than, said lateral shape so said skirt can move vertically along said vertical wall between a lowered transporting position and a raised feeding position while extending over said opened top of said container, said container has a central cylindrical core around which said wire is coiled and a freely movable payout ring around said core and over said wire.

15. A transporting and feeding package for a coil of welding wire, said package comprising a wire receiving container with a vertical wall having a lateral shape and defining an opened top of said container, a wire feeding hat with a wire outlet and a downwardly extending skirt having a lower end with an opening and having a shape matching, but slightly larger than, said lateral shape so said skirt can move vertically along said vertical wall between a lowered transporting position and a raised feeding position while extending over said opened top of said container, said container has a central cylindrical core around which said wire is coiled, a freely movable payout ring around said core and over said wire and a biased hold down bar extending across said payout ring, through vertical slots in said core and out at least a vertical slot in said container vertical wall whereby said payout ring is biased downwardly against said wire when said hat is in said transporting position.

16. A package as defined in claim 15 wherein said lateral shape and said matching shape are circular.

* * * * *